UNITED STATES PATENT OFFICE.

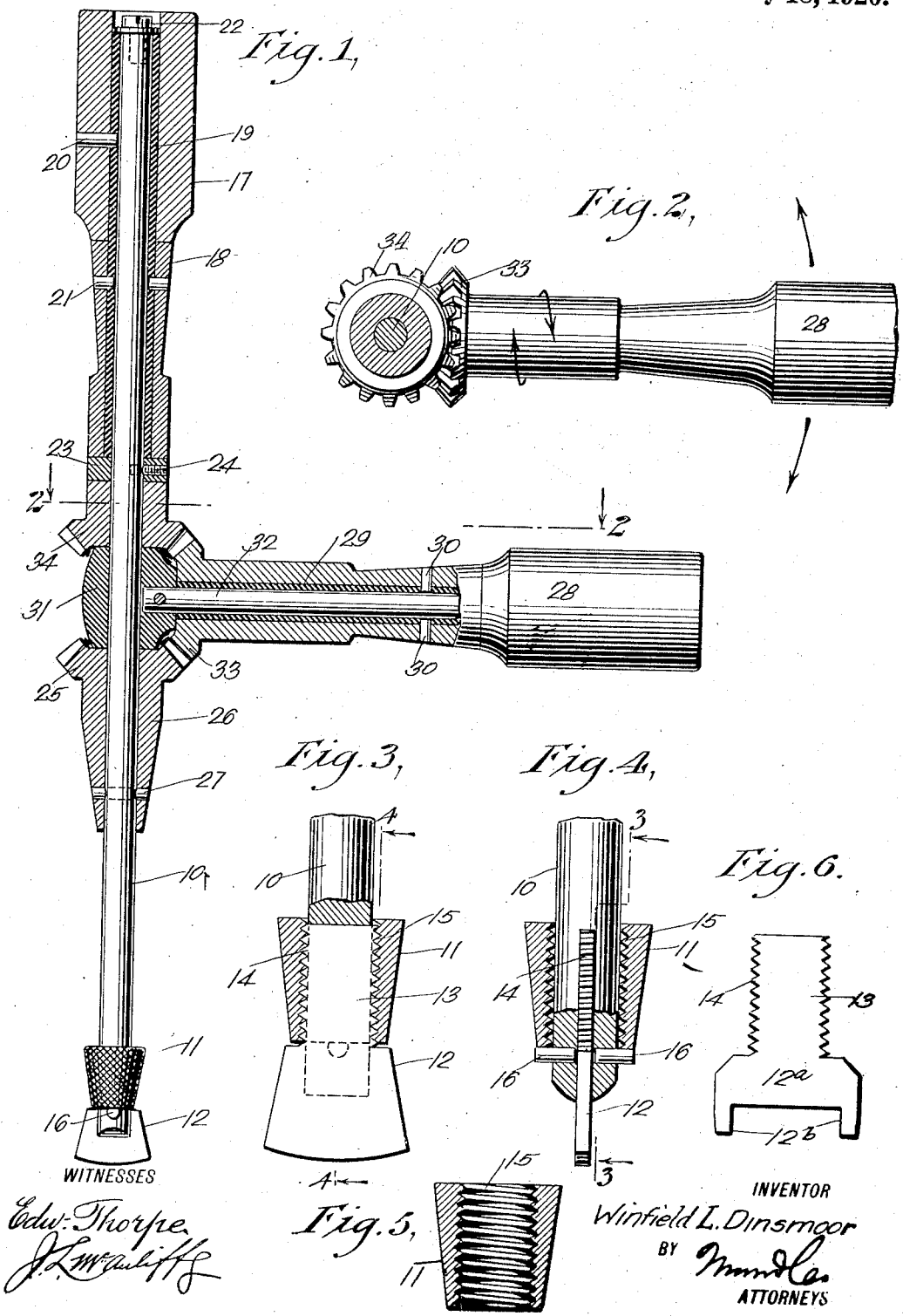

WINFIELD L. DINSMOOR, OF OAKLAND, CALIFORNIA.

VALVE-GRINDER.

1,340,756.   Specification of Letters Patent.   Patented May 18, 1920.

Application filed October 30, 1918. Serial No. 260,355.

*To all whom it may concern:*

Be it known that I, WINFIELD L. DINSMOOR, a citizen of the United States, and a resident of Oakland, in the county of Alameda and State of California, have invented a new and Improved Valve-Grinder, of which the following is a description.

My invention relates to a valve grinder and more particularly to a tool especially adapted for grinding the valves of internal combustion engines, either the engines of automobiles or the like, flying machines, or stationary engines.

An object of the invention is to provide a grinding tool having means to engage the valve and vibrate the same back and forth on its seat for effective grinding and adapted also to be given a movement to optionally shift the valve to vary its position on its seat during the grinding operation, the shifting of the position of the valve on its seat being necessary for true grinding.

A more specific object of the invention is to provide a valve grinder involving a spindle provided with valve-engaging means at the front and a handle loose on the spindle at the rear end to turn freely thereon, together with a lateral handle at right angles to the spindle and arranged to turn about its own axis or to be turned or vibrated back and forth in its own plane with means to turn the grinding spindle with either movement of the lateral handle.

The invention has for its purpose also to provide a valve grinder improved in various particulars with respect to the different relatively turnable elements and the character of the valve-engaging device as well as the means for locking said device removably to the spindle.

Reference is to be had to the accompanying drawings forming a part of this specification, it being understood that the drawings are merely illustrative of one example of the invention.

Figure 1 is a vertical section of a valve grinder embodying my invention;

Fig. 2 is a sectional plan view on the line 2—2, Fig. 1;

Fig. 3 is a detail partly in side elevation and partly in section on the line 3—3, Fig. 4;

Fig. 4 is a view similar to Fig. 3 taken at right angles to the latter as indicated by line 4—4, Fig. 3;

Fig. 5 is a vertical section of a locking nut for the tool-engaging device;

Fig. 6 is a side elevation of a modified form of the tool-engaging device.

In carrying out my invention in practice, in accordance with the illustrated example, a spindle 10 is provided having means at the front end thereof to detachably secure a valve engaging device, said means including a nut 11 freely turnable on the spindle for threaded engagement therewith, said spindle being longitudinally slotted at its forward end to receive a flat blade-like valve-engaging device 12, the opposite edges of the shank 13 of which have mutilated thread elements 14 to be engaged by the internal threads 15 of the nut 11. The forward movement of the nut 11 is limited by lateral pins or equivalent projections 16 on the opposite sides of the spindle 10. In the form shown in Figs. 1, 3 and 4, the valve-engaging device 12 has a front edge somewhat after the form of a screw driver to engage a slotted valve. In Fig. 6 the valve-engaging device 12$^a$ has forwardly projecting members 12$^b$ to engage that type of valves which is formed with holes to receive the valve-turning tool. The shank 13 of the holding device 12$^a$ is the same as in the first described construction having the described mutilated thread elements 14.

At the rear end of the spindle 10 a handle or equivalent holding means is loose thereon, and may consist of a tubular wood handle section 17 and a metal section 18, these being received on a bushing 19, said handle sections 17, 18 being secured to said bushing by any suitable means such as pins 20, 21. The bushing is held against longitudinal movement on the spindle 10 by a screw 22 engaging axially in the rear end of the spindle and having a flange overlying the rear end of the bushing. Thus, the handle with its bushing is held against displacement in a rearward direction on the spindle. At the front end of the turnable handle is a collar 23 fixed to the spindle by a set screw 24 or the like.

Fixed on the spindle 10 is a bevel pinion 25 for turning the spindle. In the illustrated example, said pinion 25 has a tubular shank or extension 26 and a transverse pin 27 extends through said shank and through the spindle. The pinion 25 is turned through the medium of a handle 28 disposed at right angles to the spindle, said handle having a bushing 29 therein to which the handle is fixed by transverse pins 30 or the like. The bushing 29 turns loosely on the core 32 extending laterally from and rigid with a hub 31 loose on the spindle 10 adjacent to the pinion 25. At the inner end the handle 28 has rigid therewith a bevel pinion 33 meshing with said pinion 25. I also employ a third pinion 34 which is loose on the spindle 10 between the hub 31 and the said collar 23 and meshing with said pinion 33 at the opposite side from the pinion 25.

It will be understood from the above that the lateral handle 28 is permitted to turn about the axis of the spindle 10, the hub 31 freely turning with said handle. Also, the handle 28 may be vibrated back and forth about the axis of the spindle 10 in any given arc, that is, its angular position relative to the spindle may be varied and the handle then vibrated. Furthermore, it will be seen that the handle 28 may be turned on the core 32 about its own axis. In use the valve having been engaged by the device 12 or 12ª, according to the character of the valve, the handle 28 will be vibrated whereby to produce an effective grinding action. During the grinding action by the vibration of the handle 28 in a given arc about the axis of the spindle 10, the position of the valve on its seat may be shifted as is required for true grinding and this may be effected in one of two ways, that is to say, either the handle 28 may be swung through a greater angle than that of its vibratory movement and vibrated back and forth from its new position, or, the lateral handle 28 may be turned about its own axis, thereby, through the turning of the gear 25, shifting the position of the valve additional to the grinding movement of the valve due to the vibration of said lateral handle. The work of grinding is thus facilitated since the two operations are open to the operator for shifting the position of the valve on its seat. In practice, after the grinding action resulting from the successive vibrating of the handle 28 from different positions, said handle may be given a complete turning movement about the axis of the spindle 10 to finally smooth the work.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A valve grinder including a spindle, a valve-engaging device on the spindle at the front end, holding means loose on the spindle at the rear end to turn freely thereon, a bevel pinion fixed on the spindle to turn the latter, a hub loose on the spindle adjacent to said pinion, an elongated core rigid with said hub and extending laterally therefrom at right angles to the spindle, a handle loosely sleeved on said core, a bevel pinion rigid with the second handle and meshing with the pinion on the spindle, a third pinion loose on the spindle at the opposite side of the hub from the first pinion and meshing with the second pinion at the opposite side of the latter from the first pinion, and a collar fast on the spindle between the third pinion and said holding means.

2. A valve grinder including a spindle, means at the front end of the spindle to engage a valve, holding means loose on the spindle at the rear end, a hub loose on said spindle between said holding means and said valve engaging means having a laterally extending core, a handle mounted on said core to turn back and forth about its own axis and in addition being turnable about the axis of the spindle through a complete circle in either direction or vibratable about the axis of the spindle in any given arc, and coöperating meshing bevel pinions fast on said handle and said spindle to turn the spindle with the turning of the lateral handle about its own axis or with the turning or vibrating of said handle about the axis of the spindle.

3. A valve grinder including a spindle, a valve-engaging device at the front end of the spindle, a handle loose on the spindle at the rear end to turn freely thereon, a hub loose on the spindle adjacent to said handle, an elongated core rigid with said hub and extending laterally therefrom at right angles to the spindle, a second handle loosely sleeved on said core, to turn thereon about its own axis, said second handle being turnable with the hub about the axis of the spindle or vibratable in any given arc about the axis of the spindle, and means for turning the spindle by the turning of the second handle about its own axis or about the axis of the spindle or by the vibration of the lateral handle about the axis of the spindle.

4. A valve grinder including a spindle, means to turn the same, said spindle having a longitudinal slot at the front end, a valve-engaging device having a shank thereon adapted to be received in said slot and formed with mutilated thread elements at the opposite edges, and a nut freely turnable on the spindle and adapted to engage the thread elements on said shank; together with means on the spindle in front of the nut to limit the forward movement of the latter.

WINFIELD L. DINSMOOR.